UNITED STATES PATENT OFFICE.

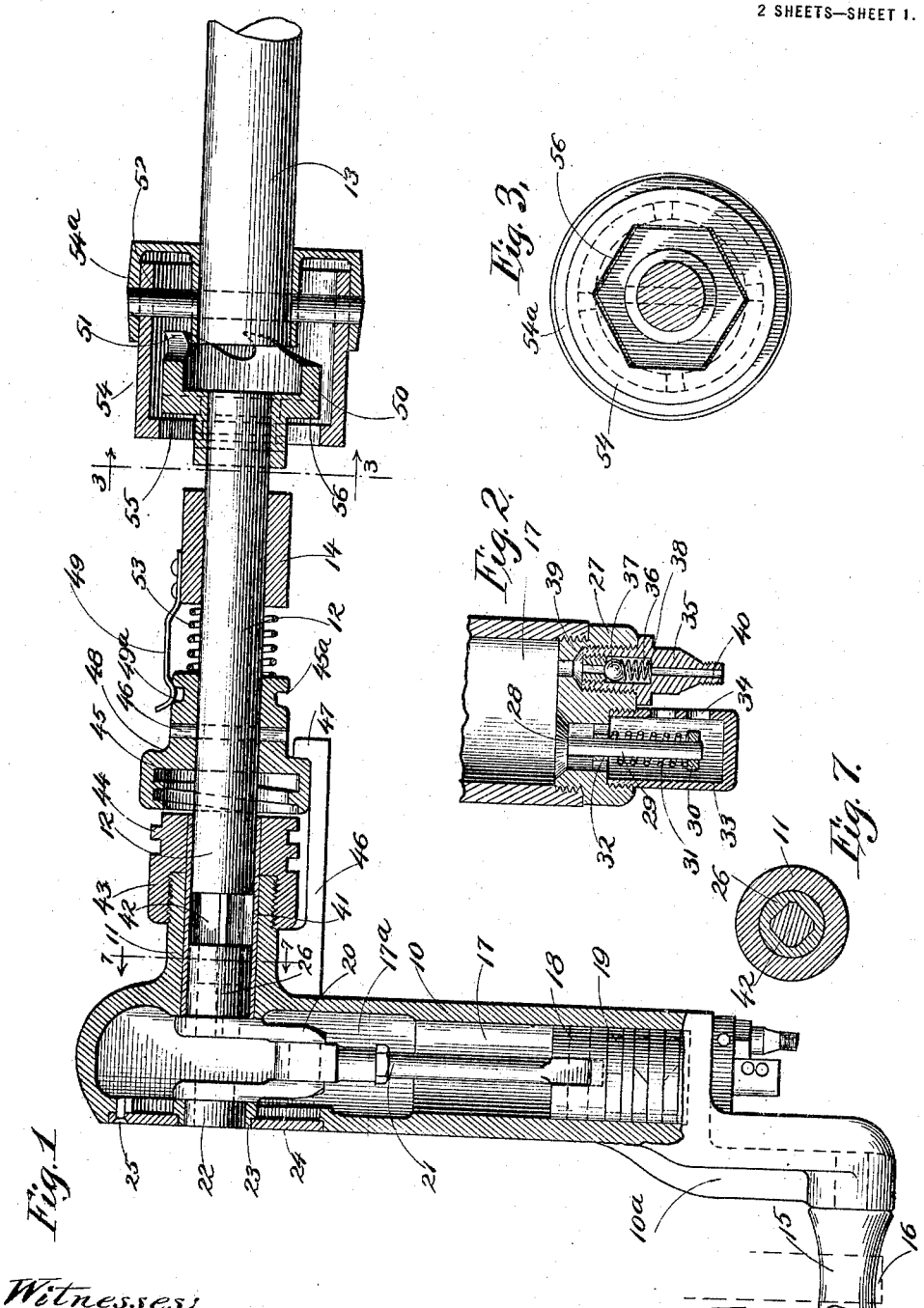

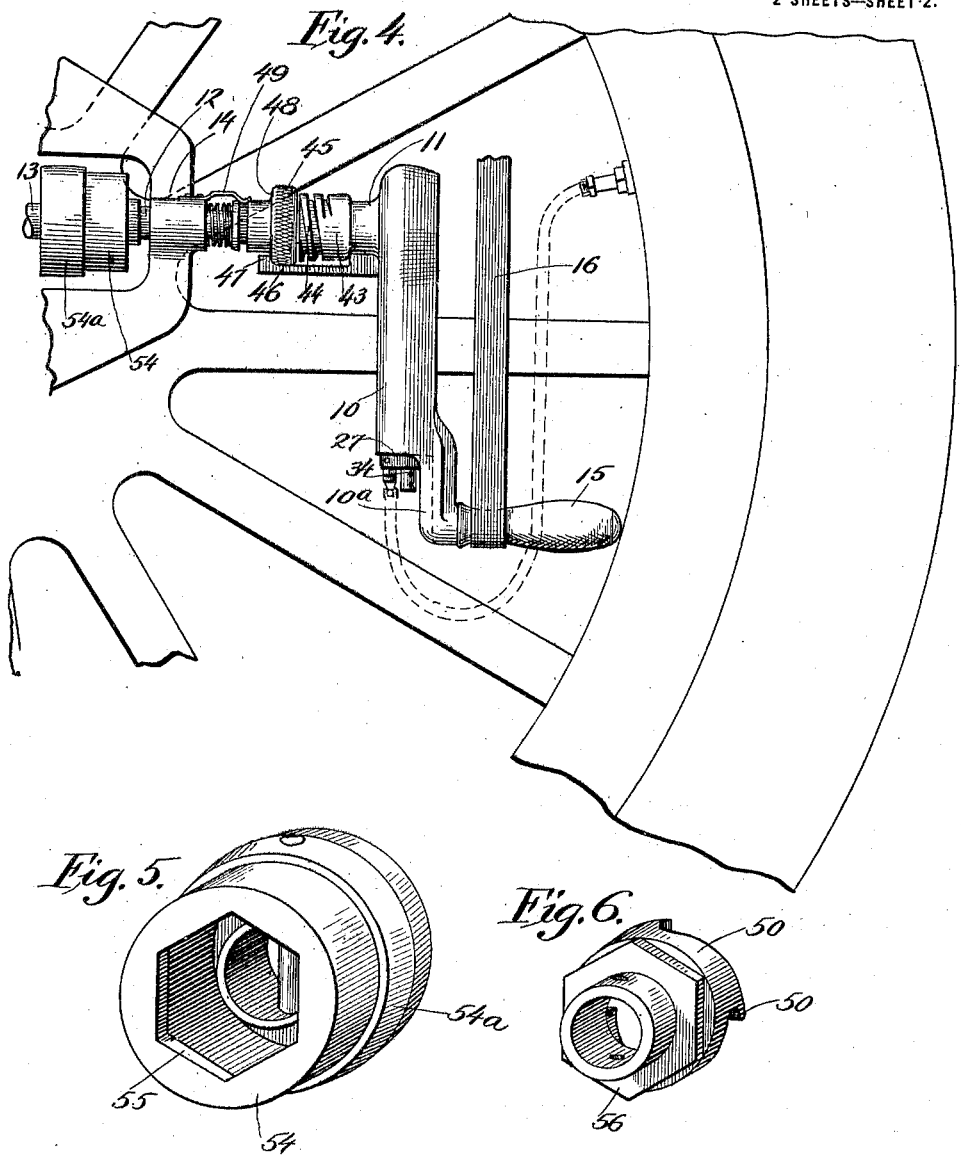

JOHN H. JANN, OF CHICAGO, ILLINOIS, ASSIGNOR TO CHICAGO AUTOMATIC MACHINE COMPANY, A CORPORATION OF ILLINOIS.

PUMP.

1,302,665.   Specification of Letters Patent.   Patented May 6, 1919.

Application filed January 2, 1915. Serial No. 149.

*To all whom it may concern:*

Be it known that I, JOHN H. JANN, a citizen of the United States, residing at Chicago, in the county of Cook and State of Illinois, have invented certain new and useful Improvements in Pumps, of which the following is a specification.

This invention relates to air pumps of a form especially adapted to be power actuated and to be used in connection with automobiles for inflating the pneumatic tires thereof, or filling a storage tank.

An important object of the invention is to combine the pump with a part of the usual automobile equipment and in such a manner that the pump may be conveniently used when desired.

A further object is to combine the pump with the usual starting crank without interfering with the usual function of the latter and in a manner to permit the driving of the pump by the motor shaft when occasion may require.

A still further object is to provide means for transmitting power from the crank to the motor shaft and from the motor shaft to the pump by means of a single intermediate operating shaft.

These and other objects of the invention will be more clearly set out in the following specification taken in connection with the accompanying drawings in which I have illustrated one specific embodiment of the invention.

In the drawings:

Figure 1 is a vertical section through my improved device showing parts thereof in elevation;

Fig. 2 is a vertical section through the lower end of the pump chamber showing the details of the inlet and outlet valves;

Fig. 3 is a section taken on the line 3—3 of Fig. 1 looking in the direction of the arrows;

Fig. 4 is a side elevation of a portion of an automobile showing my improved device assembled thereon;

Fig. 5 shows a perspective view of a clutch member;

Fig. 6 shows a perspective view of a complementary clutch member adapted to coact with the member shown in Fig. 5, and Fig. 7 is a section on line 7—7 of Fig. 1.

In the drawings, I have shown the pump as combined with the usual crank arm of an automobile by means of which the motor shaft is rotated to start the motor. The crank arm and pump casing designated by the numeral 10 is provided with an offset hub portion 11, by means of which the crank arm or pump casing is supported upon an intermediate operating shaft 12 which transmits motion from the crank arm to the motor shaft 13, or from the motor shaft to the pump contained within the crank arm or pump casing. The operating shaft 12 is slidably and rotatably mounted in a relatively stationary part of the automobile frame, as designated by the numeral 14, and as shown more clearly in Fig. 4.

The crank arm 10 which also serves as a pump casing is provided with an extension 10$^a$ which carries the operating handle 15 and when the crank is not in use for starting the motor, the crank arm or pump casing may be retained in a relatively stationary position by means of the usual strap 16, or other suitable means. The pump casing or crank arm 10 is provided at its outer or lower end with a cylindrical bore 17 in which the pump piston 18 reciprocates. This pump piston carries the usual piston rings 19 and is operated by means of a pump crank 20 to which it is connected by means of the usual connecting rod 21. One arm of the pump crank 20 is provided with a bearing 22 which revolves in a journal member 23 mounted in a cover plate 24 which is secured to the pump casing by means of screws 25 so that it may be detached therefrom to permit access to the parts of the pump mechanism. The other arm of the pump crank 20 is provided with a bearing or stub shaft 26 which is rotatably mounted in the hub portion 11 of the pump casing. The pump crank 20 is thus mounted to revolve in the chamber 17$^a$ at the upper end of the pump casing.

The lower or outer end of the cylindrical bore 17 is closed by a valve head 27 which has screw threaded engagement with the pump casing to form an air-tight connection therewith. This valve head 27 is provided with an inlet valve 28 having the valve stem 29 with the valve nut 30 secured to the end thereof. A coiled spring 31 is mounted between the nut 30 and the shoulder 32 of the valve head, and acts normally to maintain the valve 28 in closed position. The spring 31 and associated parts are inclosed by a detachable valve cap 33 having apertures 34 therein through which the air is admitted. Upon the up-stroke of the pump piston the suction will operate to open the valve 28 and draw air into the cylindrical bore 17. Upon the down-stroke of the pump piston the air is forced out through an outlet valve which comprises the apertured body member 35 having a chamber 36 therein containing a spherical ball 37 which is actuated by the spring 38 to normally close the passage 39 which leads from the chamber 36 to the interior of the pump chamber. When the air is compressed within the pump chamber the ball 37 will be forced downwardly against the spring 38 thereby permitting the air to pass outwardly through the passages 39 and 40.

The hub portion 11 of the pump casing is provided with a bearing sleeve 41 of Babbitt metal or other suitable material which is rotatably mounted upon the bearing or stub shaft 26 of the pump crank and slidably and rotatably mounted upon the adjacent extremity of the operating shaft 12. The bearing or stub shaft 26 is provided with an axial recess having a square or other suitable cross section, adapted to be engaged by a projection 42 of the operating shaft 12, which projection has a similar cross section so as to form a slidably but non-rotative engagement with the stub shaft 26. The hub portion 11 of the pump casing has secured thereto a member 43 which is provided on its outer surface with relatively coarse threads 44 which are adapted to engage corresponding threads on the clutch nut 45 which is rigidly secured to the operating shaft 12 by means of the pin 46 or other suitable means. It will have been seen that the pump casing is freely rotatable upon the operating shaft 12, and when it is desired to form a rigid connection therebetween the crank or casing 10 may be rotated to cause the threads 44 to engage the nut 45 whereupon a rigid connection will be formed between the crank or pump casing and the operating shaft 12 for continued rotation in the same direction. As this takes place, the projection 42 will slide farther into the recess in stub shaft 26, a distance determined by the advance of the member 43. The pump casing is normally retained in position on the operating shaft 12 by means of the bracket 46 which is integral with or suitably secured to the pump casing and which carries the hook 47 adapted to coact with the shoulder 48 of the nut 45.

When a rigid connection has been formed between the crank or pump casing 10 and the operating shaft 12 by causing the threads 44 to engage the nut 45, it will be seen that the apparatus can then be used for rotating the motor shaft to start the engine, and in order to transmit motion from the operating shaft to the motor shaft for this purpose the extremity of the operating shaft is provided with a clutch member 50 provided with teeth 51 which are adapted to engage the clutch pin 52, carried by the motor shaft, when the operating shaft is rotated in one direction, but which are adapted to become disengaged therefrom when the motor shaft rotates with greater angular velocity than the operating shaft. This tendency of the clutch 50 to disengage from the motor shaft, when the latter rotates at a relatively high velocity, is increased by the action of a coiled spring 53 which is mounted between the stationary part 14 of the automobile frame and the adjacent extremity of the nut 45.

The clutch pin 52 which passes through the motor shaft also operates to secure in position a sleeve 54$^a$, which may be the usual fan pulley, and a complementary clutch sleeve 54, and for the purpose of transmitting motion from the motor shaft to the operating shaft 12 the clutch sleeve 54 is provided with an engageable portion 55 having an octagonal or other suitable contour adapted to be engaged by a portion 56 of similar contour carried by the clutch member 50. When the operating shaft is moved outwardly from the motor shaft in its bearing 14, the portion 56 will engage the portion 55 of the clutch sleeve and thereby form a non-rotative engagement between the motor shaft and the operating shaft 12. The clutch member 50 is maintained in normal inoperative position between the portion 55 and the clutch pin 52, as shown in Fig. 1, by means of a spring clip 49 which is secured to the relatively immovable member 14 and which is provided with an angular projection 49$^a$ adapted to engage an annular groove 45$^a$ in the nut 45.

In the operation of the device, if the operator desires to rotate the motor shaft 13 to start the motor, the strap 16 is released and the handle 15 operated to give the crank 10 a rotary motion in a direction corresponding to the direction of angular advance of the threads 44. At the same time the crank 10 is thrust inwardly toward the motor shaft 13, thus causing the threads 44 to engage the nut 45, as the stub shaft 26 slides on the projection 42, and at the same time sliding the operating shaft 12 to the right, as viewed in Fig. 1, in its bearing 14 until the teeth 51 of the clutch member 50 engage the clutch pin 52. The engagement of the teeth 44 with the nut 45 will form a rigid connection between the pump casing and the operating shaft 12 when the member 43 is passed to the limit of its movement within the nut 45, and thereafter the continued rotation of the crank arm will operate through the clutch member 50 to transmit motion to the motor shaft 13. During this time the projection 49ª of the spring clip 49 will have passed out of engagement with the annular groove 45ª and will be resting upon the hub portion of the nut 45, the spring 53 being compressed to permit the advance of the operating shaft 12 toward the motor shaft. When the motor has started, the relatively high velocity of the motor shaft 13 will cause the teeth 51 to pass out of engagement with the clutch pin 52, this action being accelerated by the spring 53. As the clutch member 50 passes out of engagement, the operating shaft 12 will slide longitudinally away from the motor shaft until the projection 49ª of the spring clip 49 again engages the annular groove 45ª.

When it is desired to operate the pump to inflate the tires of the automobile, the crank 10 is pulled outwardly until the octagonal portion 56 of the clip member 50 engages the corresponding portion 55 of the clutch sleeve 54, the projection 49ª at the same time passing out of engagement with the annular groove 45ª as the nut 45 moves to the left, as viewed in Fig. 1. If then the crank or pump casing 10 is held stationary by means of the strap 16, the rotation transmitted to the operating shaft 12, through the clutch members 50 and 54, will operate first to disengage the nut 45 from the threads 44 and thereafter to rotate the pump crank 20, which is always in non-rotative engagement with the operating shaft 12. The operation of the pump crank 20 will reciprocate the pump piston 18, drawing in air through the inlet valve 28 and expelling it through the outlet valve, as above described. After finishing the pumping operation, the pump casing is pushed inwardly toward the motor shaft until the portion 56 passes out of engagement with the portion 55 and projection 49ª again engages the groove 45ª.

It will be seen that an important advantage of my novel device lies in its simplicity of structure and convenience of operation, whereby with the use of a small number of parts and a single operating shaft, which may be and preferably is of solid formation, I am able to transmit motion from the crank to the motor shaft or from the motor shaft to the pump, as desired.

While I have shown a particular form and have described a particular method of operation of my improved device, it will be understood that I contemplate various changes in form and arrangement of parts, as circumstance may suggest or necessity require, without departing from my invention as defined by the appended claims.

What I claim is:

1. In combination, a crank, a pump carried by said crank, a single operating shaft to drive said pump, a motor shaft, and means for transmitting motion from said crank to said motor shaft and from said motor shaft to said pump through said operating shaft.

2. In combination, a crank, a motor shaft, a pump, and means comprising a single intermediate shaft permanently connected to said pump for transmitting motion from said crank to said motor shaft and from said motor shaft to said pump.

3. In combination, a crank, a motor shaft, a pump carried by said crank, means comprising an intermediate operating shaft for transmitting motion from said crank to said motor shaft, and means comprising said operating shaft for driving said pump from said motor shaft.

4. In combination, a pump, a solid operating shaft, means to form a non-rotative engagement between the casing of said pump and said operating shaft, a motor shaft, and means to form a non-rotative engagement between said operating shaft and said motor shaft.

5. In a device of the class described, a motor shaft, a slidably mounted operating shaft in alinement therewith, means to form a non-rotative engagement between said shafts in either of two extreme positions of the operating shaft, a pump carried by said operating shaft, means to permit the use of said pump to rotate said operating shaft in one extreme position thereof for starting a motor operatively connected to said motor shaft, and means to permit operation of said pump by said motor shaft in the other extreme position of said operating shaft.

6. In a device of the class described, a motor shaft, a slidably mounted operating shaft in alinement therewith, means to form a non-rotative engagement between said shafts in either of two extreme positions of the operating shaft, a pump carried by said operating shaft, means to permit the use of said pump to rotate said operating shaft in one extreme position thereof for starting a motor operatively connected to said motor shaft, means to permit operation of said pump by said motor shaft in the other extreme position of said operating shaft, and means to retain said operating shaft in an intermediate inoperative position.

7. In a device of the class described, a slidably mounted operating shaft, a pump having its casing rotatably mounted on said operating shaft, said operating shaft being operatively connected to drive said pump and arranged to support said pump, a motor shaft, means to form a non-rotative engagement between said operating shaft and said motor shaft upon longitudinal movement of said operating shaft, and means to retain said pump casing in fixed position to permit said motor shaft to operate said pump.

8. In combination, a motor shaft, a slidably mounted operating shaft, a pump operatively connected to said operating shaft, the casing of said pump being rotatably mounted upon said operating shaft, a motor shaft, means to permit non-rotative engagement of said shafts upon longitudinal movement of said operating shaft, and means to fix said pump casing on said operating shaft to permit said casing to be used as a crank-arm for rotating said motor shaft.

9. In combination, a crank, a motor shaft, an intermediate operating shaft, a pump means for forming a driving engagement between said motor shaft and said intermediate shaft in either of two positions of the latter, and means for transmitting motion from said crank to said intermediate shaft and from said intermediate shaft to said pump.

10. In combination, a crank, an intermediate shaft, a motor shaft, means for effecting a driving engagement between said intermediate shaft and said motor shaft in either of two positions of the former, and means to form a driving engagement between said crank and said intermediate shaft.

11. In combination, a crank, an intermediate shaft, a motor shaft, means for effecting a driving engagement between said intermediate shaft and said motor shaft in either of two positions of the former, and means operated by the rotation of said crank with respect to said intermediate shaft for forming a driving engagement between said crank and said intermediate shaft.

12. In combination, a crank, a pump, an intermediate shaft, a motor shaft, said intermediate shaft being operatively connected to said pump, means for effecting a driving engagement of said intermediate shaft with said motor shaft, and means operated by the rotation of said crank with respect to said intermediate shaft for effecting a driving engagement of said crank with said intermediate shaft, said crank and intermediate shaft being arranged to rotate said motor shaft for starting a motor upon continued rotation of the crank in the same direction after said crank has formed a driving connection with the intermediate shaft, said motor shaft being adapted to pass automatically out of driving engagement with the intermediate shaft after the motor has been started.

13. In a device of the class described, an intermediate shaft, a motor shaft adapted to be driven by said intermediate shaft, a crank rotatably mounted on said intermediate shaft, a nut fixed on said intermediate shaft, and a threaded part carried by said crank and arranged to engage said nut to effect a driving connection between said crank and said intermediate shaft upon rotation of the crank.

14. In a device of the class described, an intermediate shaft, a motor shaft adapted to be driven by said intermediate shaft, a crank rotatably mounted on said intermediate shaft, a nut fixed on said intermediate shaft, a threaded part carried by said crank and arranged to engage said nut to effect a driving connection between said crank and said intermediate shaft upon rotation of the crank, and means to limit the movement of said crank on said intermediate shaft with respect to the nut.

15. In combination, a motor shaft, an intermediate shaft, a relatively fixed member in which said intermediate shaft is rotatably and slidably mounted, means for effecting a driving connection between said intermediate shaft and said motor shaft when said intermediate shaft is moved longitudinally to either of two positions, a crank rotatably mounted with respect to said intermediate shaft, a pump carried by said crank and operatively connected to said intermediate shaft to be driven thereby, and means operated by the initial rotation of said crank for forming a non-rotative engagement between said crank and said intermediate shaft, said crank and said intermediate shaft being arranged to rotate said motor shaft upon the continued rotation of the crank in the same direction thereafter with said intermediate shaft in one of said positions, the rotation of said motor shaft thereafter with said intermediate shaft in the other of said positions being adapted first to disconnect said crank from said intermediate shaft and then to operate the pump through the intermediate shaft.

16. In combination, a crank, an intermediate shaft, a motor shaft, means for effecting a driving engagement between said intermediate shaft and said motor shaft in either of two positions of the former, and means for forming a driving engagement between said crank and said intermediate shaft when the latter is in one of said positions, whereby said motor shaft may be turned by operating said crank, said means also serving to automatically disconnect said crank from said intermediate shaft when the latter is operated in the other of its positions.

17. In combination, a crank, an intermediate shaft, a motor shaft, means for effecting a driving engagement between said intermediate shaft and said motor shaft in either of two positions of the former, and means for forming a driving engagement between said crank and said intermediate shaft when the latter is in one of said positions, whereby said motor shaft may be turned by operating said crank, the operation of said intermediate shaft by power derived from said motor shaft when the former is in the other of its positions, serving to automatically disconnect said intermediate shaft from said crank, whereby the former may operate independently of the latter.

18. In combination, a crank, an intermediate shaft, a motor shaft, means for effecting a driving engagement between said intermediate shaft and said motor shaft in either of two positions of the former, and means to form a driving engagement between said crank and said intermediate shaft, said last-named means being designed to coöperate with said crank and said intermediate shaft in such wise that force applied directly to said crank to turn it in one direction rotates said motor shaft when said intermediate shaft is in one of its operative positions, and power applied to the motor shaft to turn it in the same direction operates said intermediate shaft independently of said crank when said intermediate shaft is in the other of its operative positions.

In testimony whereof, I have subscribed my name.

JOHN H. JANN.

Witnesses:
GLEN E. SMITH,
HENRY A. PARKS.

Copies of this patent may be obtained for five cents each, by addressing the "Commissioner of Patents, Washington, D. C."